May 4, 1965  E. J. FORSMAN  3,181,527
FLUID COOLED DAMPER
Filed Nov. 15, 1962  2 Sheets-Sheet 1
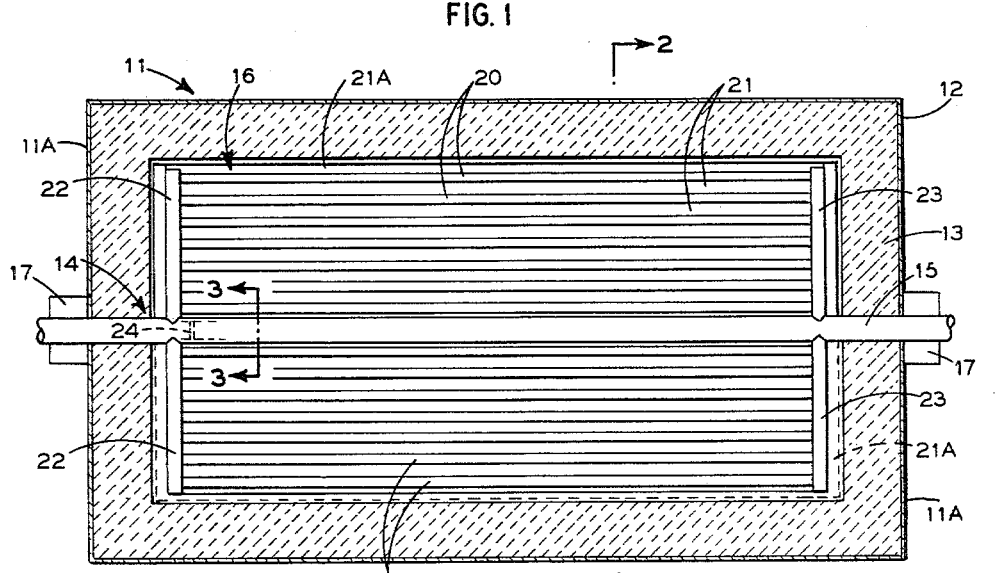
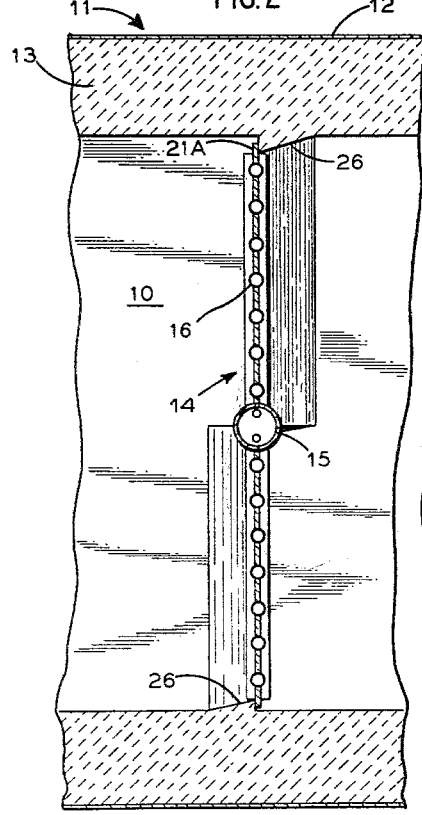
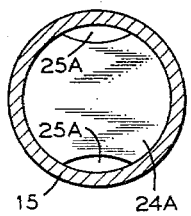
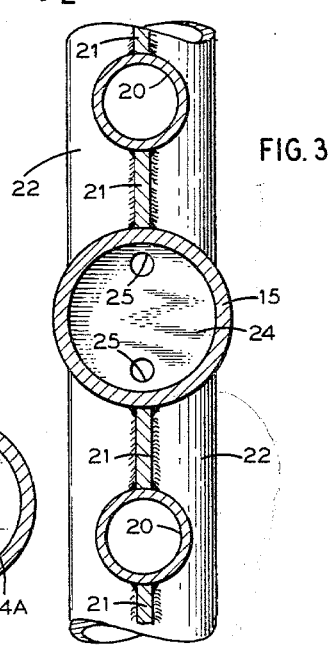
INVENTOR.
Elmer J. Forsman
BY
ATTORNEY May 4, 1965 E. J. FORSMAN 3,181,527
FLUID COOLED DAMPER
Filed Nov. 15, 1962 2 Sheets-Sheet 2
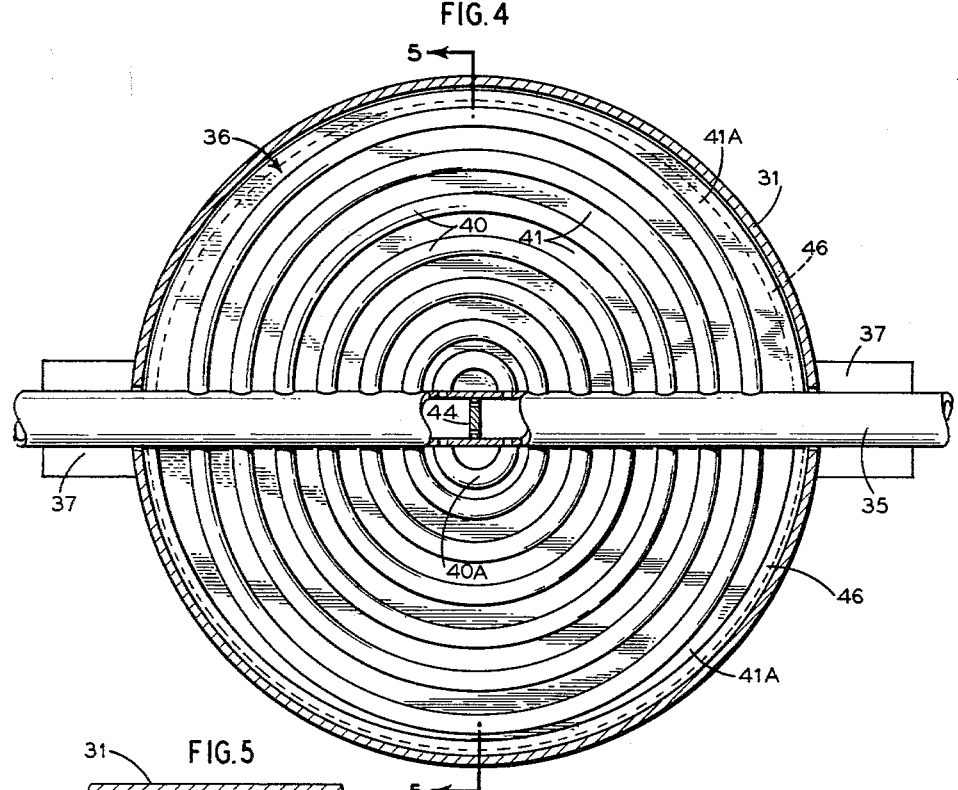
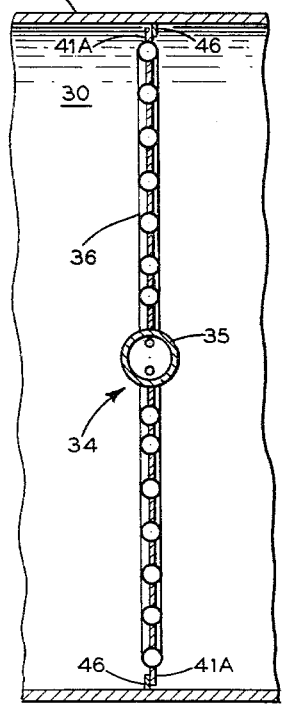
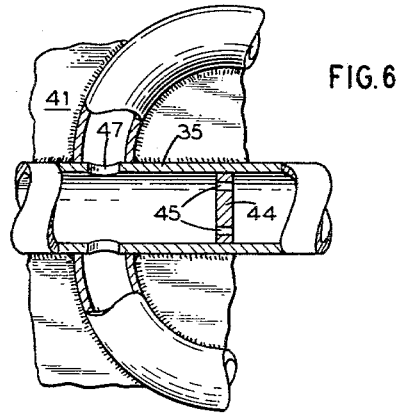

United States Patent Office 3,181,527
Patented May 4, 1965

3,181,527
FLUID COOLED DAMPER
Elmer J. Forsman, Wadsworth, Ohio, assignor to The Babcock & Wilcox Company, New York, N.Y., a corporation of New Jersey
Filed Nov. 15, 1962, Ser. No. 237,862
10 Claims. (Cl. 126—285)

This invention relates to improvements in fluid cooled dampers used for regulating the flow of a high temperature fluid in a passageway. The invention is particularly useful in the operation of boilers and furnaces; however, the scope of its application is not limited to this one phase of fluid transport regulation.

Recent developments in boiler and furnace design, as for example in the use of gas recirculation for steam temperature control, have emphasized the need for a regulating damper capable of sustained service under conditions where the fluid to be regulated, for example hot gaseous products of combustion, are at temperatures as high as 1500° F. and above. Fluid cooled dampers have heretofore been designed to withstand gas temperatures approaching 1500° F.; however, these dampers have been found unsuitable for extended service at higher temperatures because of warpage of the damper member itself and/or failure at isolated hot spots due to unequal distribution of cooling fluid within the damper plate member. Because of the limited access means for getting the cooling medium to the damper plate, fluid cooled dampers of previous designs have generally used a series flow path of fluid within the blade to cool it. As a result, when tubular elements were used to effect cooling, they were of necessity formed in tortuous paths, thereby necessitating a large number of complicated and expensive tube bends. The fluid cooled dampers previously used were also limited as to the size of the duct or flue into which they could be installed because, with the known internal cooling fluid distribution systems, the damper shaft was not cooled and thus was particularly vulnerable to distortion and failure.

It is therefore an object of this invention to provide a substantially gas tight, fluid cooled damper capable of service in a passageway wherein the gaseous products flowing are at temperatures which may be as high as 1500° F. or above. It is a further object of this invention to provide a serviceable damper wherein a cooling medium is distributed effectively throughout the damper blade and shaft, thereby preventing warpage and hot spots within the blade and shaft. It is a still further object of this invention to provide a fluid cooled damper which is simple and inexpensive to fabricate, and which includes a fluid cooled structural spanning member or shaft so that the damper can be built in a greater variety of sizes and shapes than has heretofore been possible.

In accordance with the invention, a fluid cooled damper is provided for use in a passageway which is used to confine the flow of a high temperature fluid, e.g., gaseous combustion products. The damper includes a hollow fluid-cooled shaft which supports the damper blade and provides the axis about which the damper may be positionally rotated. The ends of this shaft extend outwardly from the confines of the passageway and are supported by suitable bearings. Cooling fluid is supplied to one end of the shaft through a suitable rotatable connection. A flow restrictor to suitably apportion the cooling medium is provided within the shaft intermediate its ends. A plurality of co-planar tubular members are arranged on one or on opposite sides of the shaft. The tubes have their inlet ends connected in fluid conducting relationship to the shaft upstream of the flow restrictor, and their outlet ends connected in similar fashion to the shaft downstream of the flow restrictor. Additional flow restrictors or sized header holes may be provided for the individual tubes, if desired, to apportion the flow of cooling fluid therethrough to effect equal temperature rise in the portions of cooling fluid flowing through the individual cooling tubes. Metallic webs or membranes are provided between adjacent tubes and between the shaft and the tubes adjacent the shaft to form a unitary damper blade structure.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

Of the drawings:
FIG. 1 is a view of a rectangular damper embodying this invention;
FIG. 2 is a sectional view taken along line 2—2 of FIG. 1;
FIG. 3 is an enlarged sectional view at the damper shaft taken along line 3—3 of FIG. 1;
FIG. 4 is a view of a circular damper embodying this invention;
FIG. 5 is a sectional view taken along line 5—5 of FIG. 4;
FIG. 6 is an enlarged view of a portion of FIG. 4 partly in section, and taken at the central portion of the damper blade;
FIG. 7 is a cross sectional view of the shaft showing an alternate construction of a restrictor plate.

In the drawings FIGURES 1 and 2 is shown a portion of a duct 11 defining a passageway 10 having a rectangular cross section and in which the flow of a high temperature gaseous fluid is confined. The duct 11 is formed by an outer casing 12 which is lined with refractory material 13. A substantially gas tight damper 14 is rotatably disposed within the passageway 10 to regulate the flow of the high temperature fluid therethrough.

The damper 14 includes a damper blade 16 and a hollow shaft 15 which extends through and outwardly from each side 11A of the duct 11 and is rotatably supported by bearings 17 which are affixed to the outer casing 12. Cooling fluid is supplied to one end of the shaft 15 through a pressure tight, rotatable connection (not shown). Any suitable cooling fluid such as steam or water may be used; however, it is preferable that the inlet temperature of the coolant used be above the dew point of the fluid flowing within the passageway 10 to prevent condensation of corrosive constituents contained in the gas on the outside of the damper 14.

As shown in FIGS. 1, 2, and 3, the damper blade 16 is formed by a plurality of parallel, co-planar, longitudinally extending tubes 20 interconnecting diametrically disposed web or membrane plate members 21. A pair of diametrically disposed supply headers 22 and a pair of collecting or discharge headers 23 are respectively connected perpendicular to and at opposite ends of the shaft 15, adjacent side walls 11A of the passageway 10. The tubes 20, disposed parallel to the shaft 15, interconnect the supply headers 22 and the collecting headers 23, with the axis of the tube and header assembly being co-planar with the longitudinal axis of the shaft 15. The web members 21 are welded to and interconnect adjacent tubular portions of the damper to provide a rugged unitary structure and to render the damper blade 16 impermeable to gas flow.

As shown in FIGS. 1 and 3, a restrictor plate 24 is provided in the shaft 15 downstream of and adjacent supply headers 22 so that the cooling fluid may be suitably apportioned for flow through the shaft as well as through the supply headers 22, from whence it flows into the tubes 20, through the collection headers 23, and thence back into the shaft 15. Suitably sized openings 25 are provided in restrictor plate 24 to permit sufficient cooling fluid to pass directly through the shaft 15 to effect cooling along its length between the connections of the supply headers 22 and the collecting headers 23 to the shaft 15. The restrictor plate 24 is shown in FIG. 1 as being immediately downstream of the connection of the supply headers 22 to the shaft 15. By so locating the restrictor plate 24, sizing of the holes in the restrictor can be more precisely calculated and the desired flow attained since the quality of the cooling fluid at the inlet is usually known.

An alternate construction of a restrictor plate 24A is shown in FIG. 7. In this arrangement, the openings 25A are arranged along the outer edges of the plate 24A to prevent formation of steam pockets at the restrictor plate 24A and also to facilitate complete drainage of the cooling fluid from the shaft.

Suitably sized orifices or restrictor plates 27 may be provided for the individual tubes to more properly apportion the flow of cooling fluid through any or each of the plurality of parallel fluid flow paths. It will be recognized that by the use of properly sized restrictor plates, the flow of cooling fluid can be apportioned to the various portions of the damper 14 when necessary or desirable to effect more uniform cooling thereof. It should be further recognized that the optimal result would be obtained if the cooling fluid flowing through the individual tubular members would experience an equal rise in temperature.

As shown in FIGURE 2, refractory stops 26 are provided to engage with the outermost plate members 21A which thus serve as sealing strips. Stops 26 and damper sealing strips 21A may be provided around the entire inner periphery of the duct 11, so that a reasonably tight seal may be realized when the damper 14 is in the closed position as shown in FIGS. 1 and 2.

It should be noted that dampers of this characteristic type could also be fabricated to fit into ducts having cross sectional shapes other than the rectangular one described. In the case of extremely large ducts, multiple superposed dampers could be used, which in the aggregate conform to the contour of the duct. In the latter instance, a tubular stationary fluid cooled damper stop could be provided to effect a reasonably tight seal between individual damper blades in addition to the stops in the duct to engage the damper periphery.

In FIGURES 4 and 5 is shown an alternate embodiment of the present invention wherein the inventive concepts are applied in a damper 34 to regulate the flow of a high temperature fluid in a passageway 30 having a circular cross section defined by a duct 31. The hollow shaft 35 is supported near its outer extremities by bearings 37, and cooling fluid is supplied to one of its ends through a rotatable connection (not shown) in a manner similar to the aforedescribed embodiment.

As best shown in FIG. 4, the damper blade or member 36 is formed by a plurality of uniformly spaced, concentrically arranged, arcuate tubes of successively diminishing lengths approaching the central axis and having their spaced ends connected in flow conducting relationship to the shaft 35. The tubes are interconnected by web members 41 to provide a rugged, unitary structure. A restrictor plate 44, shown in FIGS. 4 and 6, is provided in the shaft 35 intermediate the ends of the shortest of the tubes 40A. Openings 45 in the restrictor plate 44 permit the passage of controlled quantities of cooling fluid directly through the shaft 35 to insure cooling of its central portion, and to cause the cooling fluid to flow through the tubes 40. The tubes 40 are also provided with plate orifices or drilled restrictors 47 at their inlet ends, as shown in FIG. 6. The showing in FIG. 6 relates to the shortest tube 40A, however similarly arranged restrictors may be provided at the inlet ends of all the tubes. By providing properly proportioned restrictors for all of the tubes 40, the flow therethrough can be properly distributed when necessary or desirable, so as to effect uniform cooling of the components of damper 34. Optimum cooling of the damper 34 would be realized when the same temperature rise of the cooling fluid occurs in the individual tubes 40.

In FIGURE 5, the damper 34 is shown in its closed position. In this instance the circumferentially extending outermost web member 41A is in contact with the stop plate 46 to effect a reasonably tight sealing of the passageway 30.

It should be realized that tubes disposed other than as shown in FIGURES 1 and 4 could be used to form a damper blade. Arciform tubes of any shape, as for example, U-shaped tubes could be assembled in a manner similar to that here disclosed. The versatility of the construction thus is recognized as a valuable adjunct of the invention.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A fluid cooled damper for use in a passageway confining the flow of a high temperature fluid, said damper including a hollow shaft member extending across said passageway and having an inlet end and an outlet end extending outwardly from opposite sides of said passageway, means for supplying cooling fluid to said inlet end of said shaft member, said shaft member having restricted passage means to provide a direct flow path for the passage of a portion of said cooling fluid therethrough, an impermeable damper member mounted on said shaft member and being rotatable about the longitudinal axis of said shaft member and including a plurality of tubular members arranged in a coplanar fashion, said tubular members having their inlet ends and outlet ends connected in fluid conducting relationship to said shaft member, and means for effecting flow of the remaining portion of said cooling fluid from said inlet end through said tubular members in parallel flow relation to said outlet end.

2. A fluid cooled damper for use in a passageway confining the flow of a high temperature fluid, said damper including a hollow shaft member extending across said passageway and having an inlet end and an outlet end extending outwardly from opposite sides of said passageway, means for supplying cooling fluid to said inlet end of said shaft member, a flow restrictor intermediate said inlet and outlet ends within said shaft member, and an impermeable damper member mounted on said shaft member and being rotatable about the longitudinal axis of said shaft member and including a plurality of tubular members arranged in a co-planar fashion, said tubular members having their inlet ends connected in fluid conducting relationship to said shaft member upstream of said flow restrictor and having their outlet ends connected in fluid conducting relationship to said shaft member downstream of said flow restrictor.

3. A fluid cooled damper for use in a passageway confining the flow of a high temperature fluid, said damper including a hollow shaft member extending across said passageway and having an inlet end and an outlet end extending outwardly from opposite sides of said passageway, means for supplying cooling fluid to said inlet end of said shaft member, a flow restrictor intermediate said inlet and outlet ends within said shaft member, and an impermeable damper member mounted on said shaft member and being rotatable about the longitudinal axis of said shaft member and including a plurality of tubular members arranged in a co-planar fashion, said tubular members having their inlet ends connected in fluid conducting relationship to said shaft member upstream of said flow restrictor and having their outlet ends connected in fluid conducting relationship to said shaft member downstream of said flow restrictor, and web members interconnecting said tubular members and said shaft member.

4. A fluid cooled damper for use in a passageway confining the flow of a high temperature fluid, said damper including a hollow shaft member extending across said passageway and having an inlet end and an outlet end extending outwardly from opposite sides of said passageway, means for supplying cooling fluid to said inlet end of said shaft member, a flow restrictor intermediate said inlet and outlet ends within said shaft member, to provide a direct flow path for the passage of a portion of said cooling fluid therethrough, an impermeable damper member mounted on said shaft member and being rotatable about the longitudinal axis of said shaft member and including a plurality of tubular members arranged in a co-planar fashion, said tubular members having their inlet ends connected in fluid conducting relationship to said shaft member upstream of said flow restrictor and having their outlet ends connected in fluid conducting relationship to said shaft member downstream of said flow restrictor to provide fluid flow paths of different lengths from said inlet end through said tubular members to said outlet end, and means for effecting flow of the remaining portion of said cooling fluid through said flow paths to effect substantially equal temperature rise of the portions of said cooling fluid flowing through each of said tubular members.

5. A fluid cooled damper for use in a passageway confining the flow of a high temperature fluid, said damper including a hollow shaft member extending across said passageway and having an inlet end and an outlet end extending outwardly from opposite sides of said passageway, means for supplying cooling fluid to said inlet end of said shaft member, a flow restrictor intermediate said inlet and outlet ends within said shaft member, an impermeable damper member mounted on said shaft member and being rotatable about the longitudinal axis of said shaft member and including a plurality of tubular members arranged in a co-planar fashion, said tubular members having their inlet ends connected in fluid conducting relationship to said shaft member upstream of said flow restrictor and having their outlet ends connected in fluid conducting relationship to said shaft member downstream of said flow restrictor, and a plurality of flow restrictors for said tubular members to apportion the flow of said cooling fluid therethrough.

6. A fluid cooled damper for use in a passageway confining the flow of a high temperature fluid, said damper including a hollow shaft member extending across said passageway and having an inlet end and an outlet end extending outwardly from opposite sides of said passageway, means for supplying cooling fluid to said inlet end of said shaft member, a flow restrictor intermediate said inlet and outlet ends within said shaft member, an impermeable damper member mounted on said shaft member and being rotatable about the longitudinal axis of said shaft member and including a plurality of tubular members arranged on each of opposite sides of said shaft member in a co-planar fashion, said tubular members having their inlet ends connected in fluid conducting relationship to said shaft member upstream of said flow restrictor and having their outlet ends connected in fluid conducting relationship to said shaft member downstream of said flow restrictor to provide fluid flow paths of different lengths from said inlet end through said tubular members to said outlet end, a plurality of flow restrictors for said tubular members to apportion the flow of said cooling fluid through each of said tubular members to correspond to the fluid flow path length to effect equal temperature rise of the portions of the cooling fluid flowing through each of said tubular members, and web members interconnecting said tubular members and said shaft member.

7. A fluid cooled damper for use in a rectangular passageway confining the flow of a high temperature fluid, said damper including a hollow shaft member extending across said passageway and having an inlet end and an outlet end extending outwardly from opposite sides of said passageway, means for supplying cooling fluid to said inlet end of said shaft member, a flow restrictor intermediate said inlet and outlet ends within said shaft member to provide a direct flow path for the passage of a portion of said cooling fluid therethrough, an impermeable damper member mounted on said shaft member and being rotatable about the longitudinal axis of said shaft member and including a pair of supply headers connected in fluid conducting relationship with and being disposed perpendicularly to and on opposite sides of said shaft member upstream of said flow restrictor, a pair of collection headers connected in fluid conducting relationship with and being disposed perpendicularly to and on opposite sides of said shaft member downstream of said flow restrictor, and a plurality of straight tubular members being parallel to said shaft member and interconnecting and being co-planar with said supply and collection headers, and means for effecting flow of the remaining portion of said cooling fluid from said inlet end through said tubular members in parallel flow relation to said outlet end.

8. A fluid cooled damper for use in a rectangular passageway confining the flow of a high temperature fluid, said damper including a hollow shaft member extending across said passageway and having an inlet end and an outlet end extending outwardly from opposite sides of said passageway, means for supplying cooling fluid to said inlet end of said shaft member, a flow restrictor intermediate said inlet and outlet ends within said shaft member to provide a direct flow path for the passage of a portion of said cooling fluid therethrough, an impermeable damper member mounted on said shaft member and being rotatable about the longitudinal axis of said shaft member and including a pair of supply headers connected in fluid conducting relationship with and being disposed perpendicularly to and on opposite sides of said shaft member upstream of said flow restrictor, a pair of collection headers connected in fluid conducting relationship with and being disposed perpendicularly to and on opposite sides of said shaft member downstream of said flow restrictor, and a plurality of straight tubular members being parallel to said shaft member and interconnecting and being co-planar with said supply and collection headers, means for effecting flow of the remaining portion of said cooling fluid from said inlet end through said tubular members in parallel flow relation to said outlet end, and a plurality of flow restrictors for said tubular members to apportion the flow of said remaining portion of said cooling fluid therethrough.

9. A fluid cooled damper for use in a passageway confining the flow of a high temperature fluid, said damper including a hollow shaft member extending across said passageway and having an inlet end and an outlet end extending outwardly from opposite sides of said passageway, means for supplying a cooling fluid to said inlet end of said shaft member, a flow restrictor intermediate said inlet and outlet ends within said shaft member to provide a direct flow path for the passage of a portion of said cooling fluid therethrough, an impermeable damper member mounted on said shaft member and being rotatable about the longitudinal axis of said shaft member and including a plurality of arciform tubular members arranged in a co-planar fashion, said tubular members having their inlet ends connected in fluid conducting relationship to said shaft member upstream of said flow restrictor and having their outlet ends connected in fluid conducting relationship to said shaft member downstream of said flow restrictor, and means for effecting flow of the remaining portion of said cooling fluid from said inlet end through said tubular members in parallel flow relation to said outlet end.

10. A fluid cooled damper for use in a passageway confining the flow of a high temperature fluid, said damper including a hollow shaft member extending across said passageway and having an inlet end and an outlet end extending outwardly from opposite sides of said passageway, means for supplying cooling fluid to said inlet end of said shaft member, a flow restrictor intermediate said inlet and outlet ends within said shaft member to provide a direct flow path for the passage of a portion of said cooling fluid therethrough, an impermeable damper member mounted on said shaft member and being rotatable about the longitudinal axis of said shaft member and including a plurality of arciform tubular members arranged on each of opposite sides of said shaft member in co-planar fashion, said tubular members having their inlet ends connected in fluid conducting relationship to said shaft member upstream of said flow restrictor and having their outlet ends connected in fluid conducting relationship to said shaft member downstream of said flow restrictor, means for effecting flow of the remaining portion of said cooling fluid from said inlet end through said tubular members in parallel flow relation to said outlet end, and a plurality of flow restrictors in said tubular members to apportion the flow of said remaining portion of said cooling fluid therethrough.

References Cited by the Examiner
UNITED STATES PATENTS

| | | | |
|---|---|---|---|
| 1,542,989 | 6/25 | Connery | 126—285 |
| 1,740,192 | 12/29 | McNeil | 165—92 |
| 1,748,121 | 2/30 | Gay | 165—174 |
| 2,105,692 | 1/38 | Hunicke | 165—86 |
| 2,391,010 | 12/45 | Dalin | 126—285 |
| 2,399,357 | 4/46 | Koper | 165—176 |
| 2,987,052 | 6/61 | Armacost | 122—6 |

FOREIGN PATENTS 79,266  2/95  Germany.

JAMES W. WESTHAVER, *Primary Examiner.*